United States Patent [19]
Kogelschatz

[11] 4,320,301
[45] Mar. 16, 1982

[54] DEVICE FOR THE PRODUCTION OF OZONE

[75] Inventor: Ulrich Kogelschatz, Hausen, Switzerland

[73] Assignee: BBC Brown, Boveri & Company, Limited, Baden, Switzerland

[21] Appl. No.: 142,480

[22] Filed: Apr. 21, 1980

[30] Foreign Application Priority Data

May 22, 1979 [CH] Switzerland .................. 4782/79

[51] Int. Cl.³ .................................. C01B 13/11
[52] U.S. Cl. ...................... 422/186.18; 422/186.07
[58] Field of Search ................................ 250/532, 539

[56] References Cited

U.S. PATENT DOCUMENTS 4,051,043 9/1977 Haster et al. ............... 250/531
4,062,748 12/1977 Imris ........................ 250/532
4,232,229 11/1980 Tanaka et al. ............. 250/539

FOREIGN PATENT DOCUMENTS 2014419 8/1979 United Kingdom .............. 250/532

Primary Examiner—Deborah L. Kyle
Attorney, Agent, or Firm—Oblon, Fisher, Spivak, McClelland & Maier

[57] ABSTRACT

An ozonizer formed of a pair of tubular or plate-shaped carriers having respective electrodes arranged thereon, with the electrodes laying opposite to each other. A non-conductive layer is provided covering one of the electrodes. On the surface of the non-conductive layer facing the other electrode is provided an electrically conductive layer forming separate islands to form a discharge gap extending in the direction of the longitudinal axis of the ozonizer between the other electrode and the conductive layer forming the separate islands. The discharge gap contains a stream of an oxygenic gas or of pure oxygen.

9 Claims, 5 Drawing Figures

U.S. Patent   Mar. 16, 1982   4,320,301
FIG.1
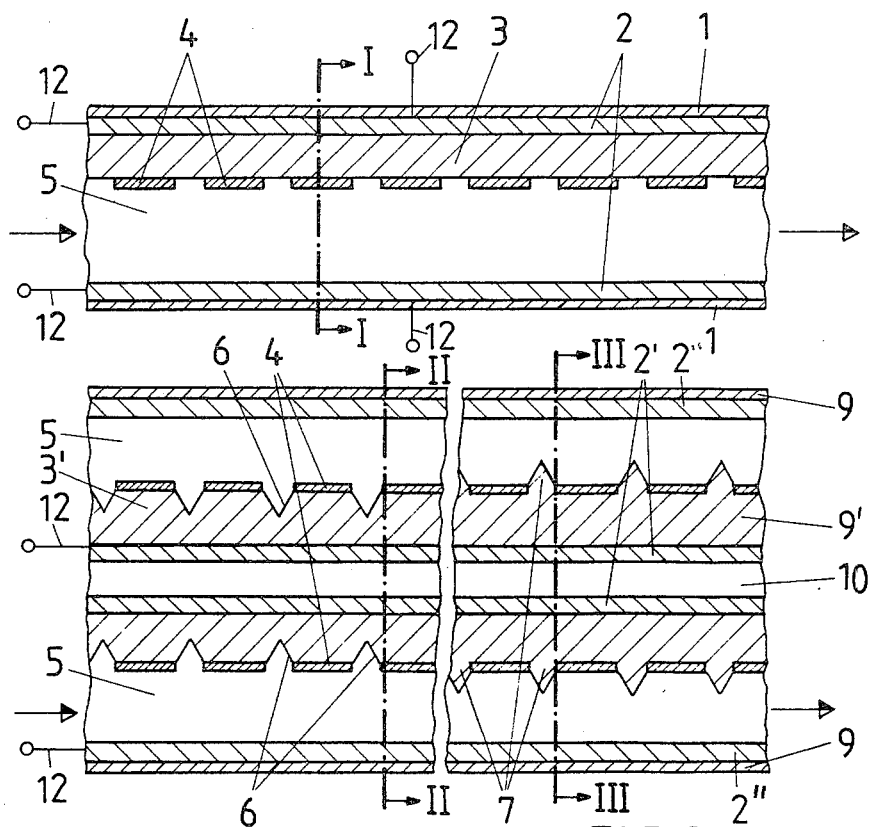
FIG.2
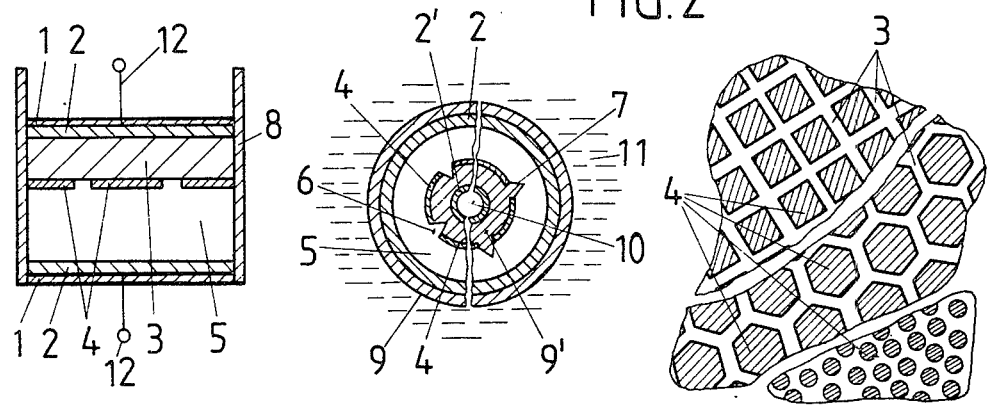
FIG.3   FIG.4   FIG.5

DEVICE FOR THE PRODUCTION OF OZONE

BACKGROUND OF THE INVENTION

1. Field of the Invention

This invention relates to an ozonizer of the type having two electrodes facing each other with one of the electrodes being provided with an insulating layer.

2. Description of the Prior Art

Ozone producing devices are being used in industrial plants in ever increasing numbers, ozone being a strong means of oxidation utilized in sewage treatment, air cleaning, the treatment of drinking water, food storage, as well as in the field of medicine and chemistry.

U.S. Pat. No. 4,051,043 describes a device for the production of ozone by means of silent discharge in gas, the device consisting of a discharge cell connected to a voltage source for its energy supply, by means of a circuit arrangement. The cell consists of two parallel, electrically conductive plate shaped electrodes, separated by a parallel non-conductive layer of even thickness, as well as by an air gap. The non-conductive layer is arranged on one of the electrodes, so that the air gap extends between this layer and the other electrode. The non-conductive layer is intended for the limitation of the discharge voltage and prevents any intensive spark and arc discharge, causing unacceptable temperature increases within the discharge gap and thus a destruction of the ozone produced. In ozonizers of this type, a multitude of surface discharges is created, statistically distributed over a certain space and time. In addition, the size of the discharging surface element depends on the surface conductivity of the non-conductive layer and on the humidity of the air flowing through the discharge gap. In an ozonizer of this type, the size of the statistically distributed uncontrolled individual discharges cannot be adjusted to the value which is most advantageous for the production of ozone.

SUMMARY OF THE INVENTION

Accordingly, the object of this invention is to provide a novel ozonizer which produces high ozone yield with low energy consumption.

These and other objects are achieved according to the invention by providing a new and improved ozonizer formed of two plate-shaped carriers, two electrodes lying opposite to each other and arranged on respective surfaces of the carriers, a non-conducting layer covering one of the electrodes, as well as an electrically conductive layer forming separate conductive islands arranged at the surface of the non-conductive layer. The conductive layer is located opposite the other electrode, thereby forming a discharge gap extending in the direction of the longitudinal axis of the ozonizer between the second electrode and the conductive layer forming the separate islands, wherein is contained a stream of an oxygenic gas or of pure oxygen. In a second embodiment, the ozonizer is designed in tubular form as a tubular ozonizer.

It is the effect of the design of the non-conductor as proposed by the invention that the amount of the discharge transferred to the oxygenized gas mixture within the discharge gap during the discharge process can be adjusted to an exact value adapted to the prevailing requirements, thus markedly increasing the ozone yield.

Advantageously, prominences can be provided between the electrically conductive islands to increase the electrical insulation and prevent possibly occurring electrical flashovers between conductive islands, in the event that adjacent conductive islands do not discharge simultaneously and thus come to rest on different electrical potentials for a brief time. Otherwise, in another embodiment involving particularly simple means for providing an effective insulation of the electrically conductive islands, the non-conductive layer is provided with indentions in parts thereof not covered by the conductive layer. With an arrangement of the electrodes on relatively displaceable plate-shaped carriers, the width of the air gap between the electrodes can be adapted to the respective requirement by a displacement of the carrier plates at right angles to the longitudinal axis of the ozonizer. Also, the tubular ozonizer embodiment noted above permits particularly effective cooling of the electrodes.

An additional embodiment of the invention, wherein the conductive islands are designed as polygons, preferably hexagons, permits the placement of a large number of electrically conductive islands onto the non-conductive layer, while at the same time preventing electrical flashovers therebetween.

According to yet another embodiment of the invention, the conductive islands may be designed in the shape of circular lamina, resulting in a less efficient utilization of space, combined with the advantage of an even potential distribution.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross-sectional view along the longitudinal axis of a plate-ozonizer;

FIG. 2 is an axial sectional view through a tubular ozonizer;

FIG. 3 is a cross-sectional view along line I—I in FIG. 1;

FIG. 4 sections along lines II—II and III—III, respectively, in FIG. 2;

FIG. 5 is a top view of a section of the non-conductive layer.

DESCRIPTION OF THE PREFERRED EMBODIMENTS

Referring now to the drawings, wherein like reference numerals designate identical or corresponding parts throughout the several views, and more particularly to FIGS. 1 and 3 thereof, in the plate ozonizer there shown, electrodes 2, in the form of thin, electrically conductive layers consisting of, for instance, conductive silver, are applied by metallizing techniques to plate-shaped carriers 1 made of insulating material, and are distanced from each other at right angles to their longitudinal axis.

One of the electrodes 2 is covered on its surface facing the second electrode by a non-conductive layer 3, which may be, for instance, made of glass. The non-conductive layer 3, on its side facing the second electrode is provided with electrically conductive islands 4 which are separated from each other and are located, for instance, at distances of 0.1 to 1.0 mm from each other and are made of silver or of aluminum, having a thickness of about 1 $\mu$m. A discharge gap 5 runs between the non-conductive layer 3, and the second electrode. The electrically conductive islands can be produced by very simple metallizing and etching techniques commonly used in semiconductor technology.

The electrically conductive islands 4, as shown in FIG. 5, are designed as squares or as regular hexagons; it is possible, however, to make them in the shape of round plates. The electrodes 2, by way of connecting terminals 12, are connected with a voltage source for the energy supply of the ozonizer (not shown). A suitable voltage source has been described in the aformentioned U.S. Pat. No. 4,051,043.

The invention operates in the following manner:

An oxygenic gas mixture, or pure oxygen, flows through the discharge gap 5 in which a silent discharge in gas takes place. This effects a separation of part of the oxygen present. The atomic oxygen thus created combines with the remaining molecular oxygen to form ozone. The non-conductive layer limits the discharge voltage and prevents the occurrence of intensive spark and/or arc discharges which would lead to a rise of temperature within the gas, and thus to a destruction of the created ozone. The silent discharge thereby is effected by the discharge of the charge existing on the conductive islands 4 through the gas. The recharging of the islands 4 takes place with a defined charge which essentially depends upon the surface size of the island and the voltage applied, and it is accomplished by way of the electrode having the non-conductive layer and the non-conductive layer 3 itself.

In the tubular ozonizer as shown in FIGS. 2 and 4, two tubes 9,9' arranged concentrically to each other and at a distance from each other at right angles to their longitudinal axis are provided with electrodes.

The outer tube 9 at its surface facing the inner tube 9' is provided with an outer electrode 2" designed as a metal tube. The inner tube 9' is made of non-conductive material. The inner wall of the inner tube 9' bears an inner electrode 2' applied as thin metallized aluminum or silver coating. The inner tube 9' at its surface which faces the metal tube 2" is provided with an electrically conductive layer of conductive silver or aluminum in the form of separate islands 4. Between these islands 4, indentations 6 about 0.1 to 1 mm deep, or, as shown in the right-hand portion of FIG. 2 or 4, respectively, prominences 7 made of non-conductive material, for instance of glass, are provided. A discharge gap 5 is formed parallel to the longitudinal axis of the ozonizer by the inner wall of the outer electrode 2" and the surface of the inner tube 9'. The outer wall of the outer tube 9 is surrounded by cooling water 11. The interior space of the inner tube 9' serves as a cooling channel 10 for a cooling medium, for instance air, water or oil.

By means of connecting terminals 12, the electrodes 2', 2" are connected with a voltage source (not shown). A suitable arrangement for the energy supply for the ozonizer is described in U.S. Pat. No. 4,051,043, to give an example.

Dimensions of a tubular ozonizer of this type are as follows: 44 mm for the outer diameter of the inner tube 9', 2 mm for the width of the air gap, 46 mm for the inside diameter of the outer electrode 2" formed by a metal tube, and 8 kV for the conducting voltage. The size of the island surface may be from 10 mm$^2$ to 1000 mm$^2$.

The mode of operation of the tubular ozonizer is as follows:

An oxygenic gas mixture or pure oxygen flows through the discharge gap 5 in which a silent discharge in gas takes place in an electric field created between the electrodes 2', 2". This causes a separation of part of the oxygen present. The atomic oxygen created in this manner combines with the remaining molecular oxygen to form ozone. The silent discharge in gas within the discharge gap 5 takes place in exactly defined individual impulse discharges between the conductive islands 4 and the outer electrode 2" located opposite therefrom. The non-conductive layer 3 limits the discharge voltage and prevents the occurrence of intensive spark and/or arc discharges which would cause a temperature rise within the gas and thus a destruction of the ozone created. Recharging of the conductive islands 4 takes place in the identical manner as previously described in connection with reference to the embodiments shown in FIG. 1 or 3, respectively. The prominences or indentations between the islands 4 increase the insulation and prevent flashovers, if the islands should not discharge simultaneously, when the islands then briefly have a relative electrical potential. Cooling of the outer electrode 2" is done by means of the cooling water 11 running along the outer surface of the outer tube 9. The inner electrode 2' is cooled by a coolant such as, for instance, air, oil or water, flowing through the interior space of the inner tube 9'.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An ozonizer, comprising:
   a pair of electrodes;
   a non-conductive layer provided on the surface of at least one electrode facing the other electrode; and
   an electrically conductive layer forming electrically separated islands provided on said non-conductive layer.

2. An ozonizer according to claim 1, further comprising:
   said non-conductive layer provided with prominences extending between the islands of the electrically conductive layer.

3. An ozonizer according to claim 1, further comprising:
   said non-conductive layer provided with identations between the islands of the electrically conductive layer.

4. An ozonizer according to claim 1, further comprising:
   the electrodes arranged on plate-shaped carriers.

5. An ozonizer according to claim 4, further comprising:
   said plate-shaped carriers on which said electrodes are arranged being mutually relatively displaceable.

6. An ozonizer according to claim 1, further comprising:
   a pair of tubular electrodes forming a tubular ozonizer.

7. An ozonizer according to claim 1, further comprising:
   the separated, electrically conductive islands shaped as polygons.

8. An ozonizer according to claim 7, further comprising:
said electrically conductive islands having the shape of regular hexagons.

9. An ozonizer according to claim 1, further comprising:
said electrically conductive islands having circular shape.

* * * * *